(12) United States Patent
Lee et al.

(10) Patent No.: US 8,396,080 B2
(45) Date of Patent: Mar. 12, 2013

(54) METHOD OF PROCESSING CONTROL INFORMATION IN A MOBILE COMMUNICATION SYSTEM

(75) Inventors: Young Dae Lee, HaNam-si (KR); Sung Duck Chun, Anyang-si (KR); Myung Cheul Jung, Seoul (KR); Seong Jun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 279 days.

(21) Appl. No.: 12/431,602

(22) Filed: Apr. 28, 2009

(65) Prior Publication Data

US 2009/0207802 A1 Aug. 20, 2009

Related U.S. Application Data

(63) Continuation of application No. 11/461,382, filed on Jul. 31, 2006.

(51) Int. Cl.
*H04J 3/16* (2006.01)
(52) U.S. Cl. ........................................ 370/469
(58) Field of Classification Search ............ 370/394
See application file for complete search history.

(56) References Cited

U.S. PATENT DOCUMENTS

| | | | |
|---|---|---|---|
| 6,788,652 B1 | 9/2004 | Hwang | |
| 7,318,187 B2 | 1/2008 | Vayanos et al. | |
| 2001/0007137 A1* | 7/2001 | Suumaki et al. | 714/18 |
| 2002/0183053 A1 | 12/2002 | Gopalakrishna et al. | |
| 2003/0007480 A1* | 1/2003 | Kim et al. | 370/349 |
| 2003/0128705 A1 | 7/2003 | Yi et al. | |
| 2004/0057387 A1* | 3/2004 | Yi et al. | 370/252 |
| 2004/0057460 A1* | 3/2004 | Hwang | 370/468 |
| 2004/0203623 A1* | 10/2004 | Wu | 455/412.1 |
| 2004/0224686 A1* | 11/2004 | Pedlar | 455/435.1 |
| 2005/0063347 A1* | 3/2005 | Sarkkinen et al. | 370/338 |
| 2005/0169205 A1* | 8/2005 | Grilli et al. | 370/313 |
| 2005/0270996 A1 | 12/2005 | Yi et al. | |
| 2006/0034175 A1* | 2/2006 | Herrmann | 370/236 |
| 2007/0064631 A1* | 3/2007 | Tseng et al. | 370/278 |
| 2007/0133605 A1* | 6/2007 | Herrmann | 370/473 |
| 2007/0291788 A1* | 12/2007 | Sammour et al. | 370/466 |
| 2008/0056198 A1* | 3/2008 | Charpentier et al. | 370/332 |
| 2008/0175249 A1 | 7/2008 | Yi et al. | |
| 2008/0192671 A1 | 8/2008 | Torsner | |

FOREIGN PATENT DOCUMENTS

WO WO 2004102901 A1 * 11/2004

\* cited by examiner

*Primary Examiner* — Anh-Vu Ly
(74) *Attorney, Agent, or Firm* — Lee, Hong, Degerman, Kang & Waimey

(57) ABSTRACT

A method of processing control information in a mobile communication system is disclosed, by which an RRC connection setup can be quickly completed and by which control information can be processed without an unnecessary standby of a mobile terminal. The present invention includes the steps of receiving a plurality of protocol data units transmitted plural time from a transmitting side via one common logical channel by an RLC (radio link control) entity operating in a UM (unacknowledged mode) and having a receiving window and a timer, re-ordering a plurality of the received protocol data units using sequence numbers of a plurality of the received protocol data units, the receiving window and the timer, reassembling at least one service data unit by processing a plurality of the re-ordered protocol data units, and delivering the at least one service data unit.

7 Claims, 5 Drawing Sheets

METHOD OF PROCESSING CONTROL INFORMATION IN A MOBILE COMMUNICATION SYSTEM

CROSS-REFERENCE TO RELATED APPLICATIONS

This application is a continuation application of application Ser. No. 11/461,382 filed Jul. 31, 2006, pending, the contents of which are hereby incorporated by reference in their entirety.

BACKGROUND OF THE INVENTION

1. Field of the Invention

The present invention relates to a control information processing method, and more particularly, to a method of processing control information in a mobile communication system. Although the present invention is suitable for a wide scope of applications, it is particularly suitable for preventing a user equipment from standing by unnecessarily.

2. Discussion of the Related Art

FIG. 1 is a block diagram of a network structure of UMTS (universal mobile telecommunications system).

Referring to FIG. 1, a universal mobile telecommunications system (hereinafter abbreviated UMTS) mainly includes a user equipment (hereinafter abbreviated UE), a UMTS terrestrial radio access network (hereinafter abbreviated UTRAN) and a core network (hereinafter abbreviated CN).

The UTRAN includes at least one radio network sub-system (hereinafter abbreviated RNS). And, the RNS includes one radio network controller (hereinafter abbreviated RNC) and at least one base station (hereinafter called Node B) managed by the RNC. And, at least one or more cells exist in one Node B.

FIG. 2 is a diagram of architecture of a radio protocol used for UMTS.

Referring to FIG. 2, radio protocol layers exist as pairs in both UE and UTRAN to take charge of data transmission in a radio section.

The respective radio protocol layers are explained as follows.

First of all, a physical layer PHY, which is a first layer, plays a role in transferring data to a radio section using various radio transfer techniques. The physical layer PHY is connected to a layer MAC as an upper layer via transport channels. And, the transport channels are mainly classified into dedicated transport channels and common transport channels according to whether the corresponding channel is shared or not.

A second layer includes MAC, RLC, PDCP and BMC layers.

First of all, a MAC layer plays a role in mapping various logical channels to various transport channels, respectively and also performs a function of logical channel multiplexing that plays a role in mapping various logical channels to one transport channel. The MAC layer is connected to an RLC layer of an upper layer via a logical channel. And, the logical channel is mainly classified into a control channel for transferring information of a control plane and a traffic channel for transferring information of a user plane according to a type of information that is transferred.

A radio link control (hereinafter abbreviated RLC) layer is responsible for guaranteeing a quality of service (hereinafter abbreviated QoS) of each radio bearer and also takes charge of a transfer of corresponding data. The RLC leaves one independent RLC entity at each RB to guarantee an intrinsic QoS of RB. The RLC offers three kinds of RLC modes including a transparent mode (hereinafter abbreviated TM), an unacknowledged mode (hereinafter abbreviated UM) and an acknowledged mode (hereinafter abbreviated AM) to support various QoS. And, the RLC plays a role in adjusting a data size to enable a lower layer to transfer data to a radio section. For this, the RLC plays a role in segmenting and concatenating data received from an upper layer.

A PDCP layer is placed above the RLC layer and plays a role in transferring data, which is transferred using an IP packet such as an IPv4 and an IPv6, efficiently in a radio section having a relatively small bandwidth. For this, the PDCP layer performs a header compression function, by which information mandatory for a header of data is transferred to raise transport efficiency in a radio section. Since header compression is a basic function of the PDCP layer, the PDCP layer exists in a packet service domain (hereinafter abbreviated PS domain) only. And, one PDCP entity exists for each RB to provide an effective header compression function to each PS service.

In the second layer, a BMC (broadcast/multicast control) layer is provided above the RLC layer. The BMC layer schedules a cell broadcast message and performs broadcasting to UEs located in a specific cell.

A radio resource control (hereinafter abbreviated RRC) layer located in a lowest part of a third layer is defined in a control plane only. The RRC layer controls parameters of the first and second layers to be associated with establishment, re-configuration and release of RBs and takes charge of controlling logical, transport and physical channels. In this case, the RB means a logical path provided by the first and second layers of a radio protocol for data transfer between UE and UTRAN. And, RB establishment means a process of regulating characteristics of radio protocol layers and channels to offer a specific service and establishing specific parameters and operational methods. When an RRC layer of a specific UE and to an RRC layer of UTRAN are connected together to exchange RRC messages with each other, the corresponding UE lies in an RRC connected state. IF they are not connected together, the corresponding UE lies in an idle state.

The RLC layer is further explained in detail as follows.

First of all, basic functions of the RLC layer are a QoS guarantee of each RB and a corresponding data transfer. Since an RB service is a service that the second layer provides to an upper layer, the entire second layer has influence on QoS. And, the RLC has the greatest influence. The RLC leaves an independent RLC entity at each RB to guarantee the intrinsic QoS of RB and offers three kinds of RLC modes of TM, UM and AM. Since the three RLC modes differ from one another in QoS supported by each of the TM. UM and AM, their operational methods are different from one another as well as their detailed functions. So, the RLC needs to be looked into according to its operational mode.

TM RLC is a mode that any overhead is not attached to RLC service data unit (hereinafter abbreviated SDU) delivered from a higher layer in configuring RLC protocol data unit (hereinafter abbreviated PDU). In particular, since an RLC transmits SDU transparently, it is called TM RLC. Due to such a characteristic, TM RLC plays the following roles in user and control planes. In the user plane, since data processing time within RLC is short, TM RLC performs a real-time circuit data transfer of a voice or streaming in a circuit service domain (hereinafter abbreviated 'CS domain'). Meanwhile, in the control plane, since there is no overhead within RLC, the RLC is responsible for a transmission of an RRC message from an unspecific UE in case of an uplink or a transmission of an RRC message broadcast to all UEs within a cell in case of a downlink.

Unlike the transparent mode, a mode of adding an overhead in RLC is called a non-transparent mode that is classified into an unacknowledged mode (UM) and an acknowledged mode (AM). By attaching a PDU header including a sequence number (hereinafter abbreviated SN) to each PDU to transfer, UM RLC enables a receiving side to know which PDU is lost in the course of transmission.

In aspect of a transmitting side RLC, a transmitting side operating in UM does not check whether a receiving side receives a corresponding PDU correctly. So, the transmitting side does not transmit a PDU that was transmitted once. In an aspect of a receiving side RLC operating in UM, a receiving side checks which PDU is lost through a sequence number of a received PDU. The receiving side does not further expect a reception of the PDU decided as lost and immediately delivers the successfully received SDU to an upper layer. For instance, if a specific UM RLC receives an RLC PDU having a sequence number of '6' after having received an RLC PDU having a sequence number of '3', the corresponding UM RLC decides that a reception of an RLC PDU having a sequence number of '4' or '5' fails and does not expect a further reception of the PDUs any more.

Owing to this function, the UM RLC is mainly responsible for a transmission of real-time packet data such as a broadcast/multicast data and a voice (e.g., VoIP) or streaming of a packet service domain (hereinafter abbreviated PS domain) in a user plane or a transmission of an RRC message needing no acknowledgement among RRC messages transmitted to a specific UE or a specific UE group within a cell in a control plane.

Like the UM RLC, an AM RLC as one of the non-transparent modes configures a PDU by attaching a PDU header including an SN thereto. Yet, the AM RLC differs from the UM RLC in that a receiving side makes acknowledgement to a PDU transmitted by a transmitting side. The reason why the AM RLC of the receiving side makes acknowledgement is because the receiving side can make a request for a retransmission of a missing PDU by the transmitting side. And, this retransmission function is the most outstanding feature of the AM RLC. So, the object of the AM RLC is to guarantee an error-free data transmission through the retransmission. Owing to this object, the AM RLC mainly takes charge of a transmission of non-real-time packet data such as TCP/IP of PS domain in a user plane.

The UM RLC is explained in detail as follows.

First of all, the UM RLC establishes and manages the following environmental variables.

First of all, VR(US) indicates a next reception number. This value means a value right next to an SN value of a last received RLC PDU. Namely, if an SN value of 'x' is received, VR(US) is set to 'x+1'.

In case of receiving RLC SDUs (service data units) from an upper layer (e.g., an upper layer of UM RLC), a UM RLC of a transmitting side generates an RLC PDU by adjusting the received RLC SDUs into a suitable size by segmentation and concatenation and then delivers the generated RLC PDU to a lower layer (e.g., a lower layer of the UM RLC). And, the UM RLC includes a length indicator (hereinafter abbreviated LI), which indicates a position of a boundary of RLC SDU within the RLC PDU, in order to enable a receiving side to recover the RLC SDUs from the RLC PDU.

In this case, a sequence number SN is represented as 7 bits. By representing the SN in a simple from, it is able to raise a transport efficiency of data to be delivered in a manner of reducing a header part from each RLC PDU. Hence, sequence numbers substantially transferred by being included in the RLC PDU are values belonging to a range between 0~127. So, the transmitting side sequentially assigns sequence numbers to the respective RLC PDUs from zero to use and then assigns sequence numbers from zero to reuse after assigning 127. Like this, a case that a sequence number starts to be reused from such a lower value as zero from a higher value of '127' can be regarded as a case that 'wrap-around' has occurred. Hence, RLC PDUs after the occurrence of 'wrap-around' are the RLC PDUs that must be delivered behind RLC PDUs prior to the occurrence of 'wrap-around'.

The receiving side always checks the SN of the received RLC PDU. If the SN of the received RLC PDU is smaller than that of the last received RLC PDU, the receiving side decides that 'wrap-around' has occurred. And, the entire RLC PDUs received after the 'wrap-around' occurrence are regarded as RLC PDUs generated behind the previously received RLC PDU.

FIG. 3 is a flowchart of a process for receiving RLC PDU from a lower layer in a UM RLC operation of a receiving side according to a related art.

Referring to FIG. 3, a receiving side receives an RLC PDU having an SN value (S300).

Subsequently, VR(US) is reset to correspond to the SN value of the received RLC PDU (S301).

If an updated width of the VR(US) value is not '1' in the step S301, it is decided that there exists a lost RLC PDU (S302). RLC SDUs associated with the RLC PDUs decided as lost are then deleted (S303).

If an updated width of the VR(US) value is '1', the following steps are executed.

First of all, after a recovery process has been carried out using the successfully received RLC PDUs, successfully recovered RLC SDUs are delivered to an upper layer of RLC (S304).

After the delivery (S304), the whole process is ended (S305).

An RRC state and connection method of a UE are explained in detail as follows.

First of all, an RRC state means whether an RRC of UE is in a logical connection to an RRC of UTRAN. If the RRC of the UE is in the logical connection to the RRC of the UTRAN, it is called an RRC connected state. Otherwise, it is called an RRC idle state.

Since there exists an RRC connection for a UE in an RRC connected state, a UTRAN is able to recognize an existence of the corresponding UE by a cell level. Hence, the UTRAN is able to effectively control the UE. Yet, a UTRAN is unable to recognize an existence of a UE in an RRC idle state. A core network (hereinafter abbreviated CN) manages the corresponding UE by a location area level or a routing area level that is an area unit greater than a cell. In particular, an existence or non-existence of an UE in an RRC idle state can be just recognized by a large area unit. And, the UE in the RRC idle state has to enter an RRC connected state to receive a general mobile communication service such as a voice and data.

When a user turns on a power of UE for the first time, the UE preferentially makes a search for a suitable cell and then stays in an RRC idle state at the corresponding cell. The UE in the RRC idle state establishes an RRC connection with an RRC of UTRAN through an RRC connection procedure if necessary for the RRC connection. The UE then makes a transition to an RRC connected state.

There are several cases for a UE in an RRC idle state to establish an RRC connection. For instance, the RRC connection is established if an uplink data transport is needed due to a user's attempt to make a call or the like. For another instance, the RRC connection is established if a paging message is received from UTRAN.

In order for a UE in an RRC idle state to establish an RRC connection with UTRAN, the above-explained RRC connection procedure needs to be executed.

The RRC connection procedure mainly consists of the three steps of an RRC connection request message transmission to a UTRAN from a UE, an RRC connection setup message transmission to the UE from the UTRAN and an RRC connection setup complete message transmission to the UTRAN from the UE. This RRC connection procedure is shown in FIG. 4.

FIG. 4 shows a flowchart of an RRC connection procedure according to a related art.

Referring to FIG. 4, an RRC connection request step (S401) is explained as follows.

First of all, if a UE in an RRC idle state attempts to establish an RRC connection due to a calling trial, a response to a paging of a UTRAN or the like, the UE preferentially sends an RRC connection request message to the UTRAN.

In this case, the RRC connection request message contains an initial UE identity, an RRC connection establishment cause and the like.

The initial UE identity is a unique identity of the UE and enables the corresponding UE to be globally identified regardless of the UE's location. And, there are various kinds of the RRC connection establishment causes such as a calling trial, a response to a paging and the like.

The UE drives a timer as soon as transmits the RRC connection request message. The UE retransmits the RRC connection request message unless receiving an RRC connection setup message or an RRC connection reject message from the UTRAN until the timer expires. IN this case, a maximum transmission count of the RRC connection message is limited to a specific value.

An RRC connection setup step (S402) is explained as follows.

The UE having received the RRC connection request message accepts an RRC connection request made by the UE if radio resources are sufficient. The UE then transmits an RRC connection setup message as a response message to the UE. In this case, the RRC connection setup message is transmitted by including a radio network temporary identity (hereinafter abbreviated RNTI), radio bearer setup information and the like together with the initial UE identity. And, the radio network temporary identity is a UE identity that enables the UTRAN to identify the UE in the RRC connected state. The identity is used only if there exists an RRC connection. And, the identity is used within the UTRAN only.

After the RRC connection has been set up, the UE communicates with the UTRAN using the radio network temporary identity instead of using the initial UE identity. If the initial UE identity, which is the unique identity of the UE, is frequently used, it may be drained away. So, the initial UE identity is temporarily used in the RRC connection procedure. Thereafter, the radio network temporary identity is used.

And, an RRC connection setup complete step (S403) is explained as follows.

First of all, the UE having received the RRC connection setup message checks whether the received message is a message supposed to be sent to the UE itself in a manner of comparing the initial UE identity included in the message to its identity.

If the message is the message supposed to be sent to the UE itself as a result of the check, the UE stores the radio network temporary identity assigned by the UTRAN and then transmits an RRC connection setup complete message to the UTRAN using the stored radio network temporary identity. In this case, UE capability information and the like are included in the RRC connection setup complete message.

In case of transmitting the RRC connection message successfully, the UE establishes the RRC connection with the UTRAN for the first time and then makes a transition to an RRC connected state.

Meanwhile, the RRC connection request message is transmitted on a random access channel (hereinafter abbreviated RACH), whereas the RRC connection setup message is transmitted on a forward access channel (hereinafter abbreviated FACH).

However, a network is unable to recognize an existence of the UE until the RRC connection setup is completed. So, the UE sends the RRC connection request message as a first message using the RACH shared by all UEs. And, the RACH is delivered to a connection management end of the network via a logical channel called a common control channel (hereinafter abbreviated CCCH) shared by the entire UEs. Likewise, a first message delivered to the UE from the network is delivered on a channel received by the entire UEs in common. Moreover, since a connection setup method and channel information corresponding to the UE only are included in the RRC connection setup message as the first message, the network is able to deliver the message to the corresponding UE via a common channel only until the UE receives the RRC connection setup message. In this case, the RRC connection setup message is delivered on CCCH. And, this message is transmitted in a UM RLC mode.

SUMMARY OF THE INVENTION

Accordingly, the present invention is directed to a method of processing control information in a mobile communication system that substantially obviates one or more problems due to limitations and disadvantages of the related art.

An object of the present invention is to provide a method of processing control information in a mobile communication system, by which an RRC connection setup can be quickly completed.

Another object of the present invention is to provide a method of processing control information in a mobile communication system, by which control information can be processed without an unnecessary standby of a mobile terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of processing control information in a mobile communication system according to the present invention includes the steps of receiving a plurality of protocol data units transmitted plural time from a transmitting side via one common logical channel by an RLC (radio link control) entity operating in a UM (unacknowledged mode) and having a receiving window and a timer, re-ordering a plurality of the received protocol data units using sequence numbers of a plurality of the received protocol data units, the receiving window and the timer, reassembling at least one service data unit by processing a plurality of the re-ordered protocol data units, and delivering the at least one service data unit.

In another aspect of the present invention, a method of processing control information in a mobile communication system includes the steps of transmitting a first control message for a control of a radio resource to a network, observing a specific channel receiving from the network a second control message indicating whether it received the first control message, and retransmitting the first control message to the network according to a result of the observing step.

In another aspect of the present invention, a method of processing control information in a mobile communication system includes the steps of deciding whether a first control message for a control of a radio resource is received from a mobile terminal, transmitting a second control message indicating whether it received the first control message to the mobile terminal via a specific channel according to a result of the deciding step, and re-receiving the first control message from the mobile terminal according to whether the mobile terminal receives the second control message.

In another aspect of the present invention, a method of processing control information in a mobile communication system includes the steps of receiving at least one protocol data unit from a lower layer, if at least one service data unit fails to be recovered from the at least one received protocol data unit, deciding whether a specific area of the at least one service data unit is successfully received, and delivering data including the specific area to an upper layer according to a result of the deciding step.

In another aspect of the present invention, a method of processing control information in a mobile communication system includes the steps of transmitting a control message for a control of a radio resource to a network, receiving at least one data protocol unit corresponding to a response message for the control message and including an identity for identifying a specific user equipment from the network, deciding whether at least one service data unit can be recovered from the at least one received protocol data unit, and retransmitting the control message according to a result of the deciding step.

In a further aspect of the present invention, a method of processing control information in a mobile communication system includes the steps of receiving a control message for a control of a radio resource from a mobile terminal, including an identity for identifying a specific terminal in at least one protocol data unit corresponding to a response message for the control message, transmitting the at least one protocol data unit to the mobile terminal, and re-receiving the control message from the mobile terminal according to whether the mobile terminal successfully receives the at least one protocol data unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
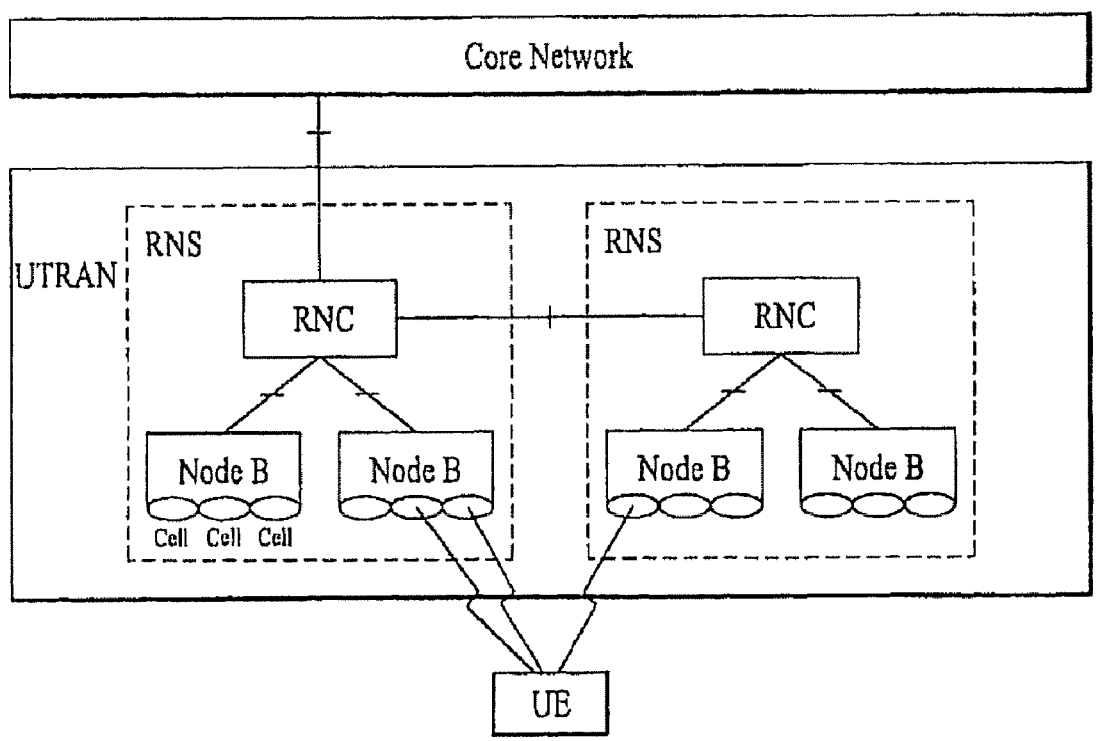
FIG. 1 is a block diagram of a network structure of UMTS (universal mobile telecommunications system)
Figure 2:
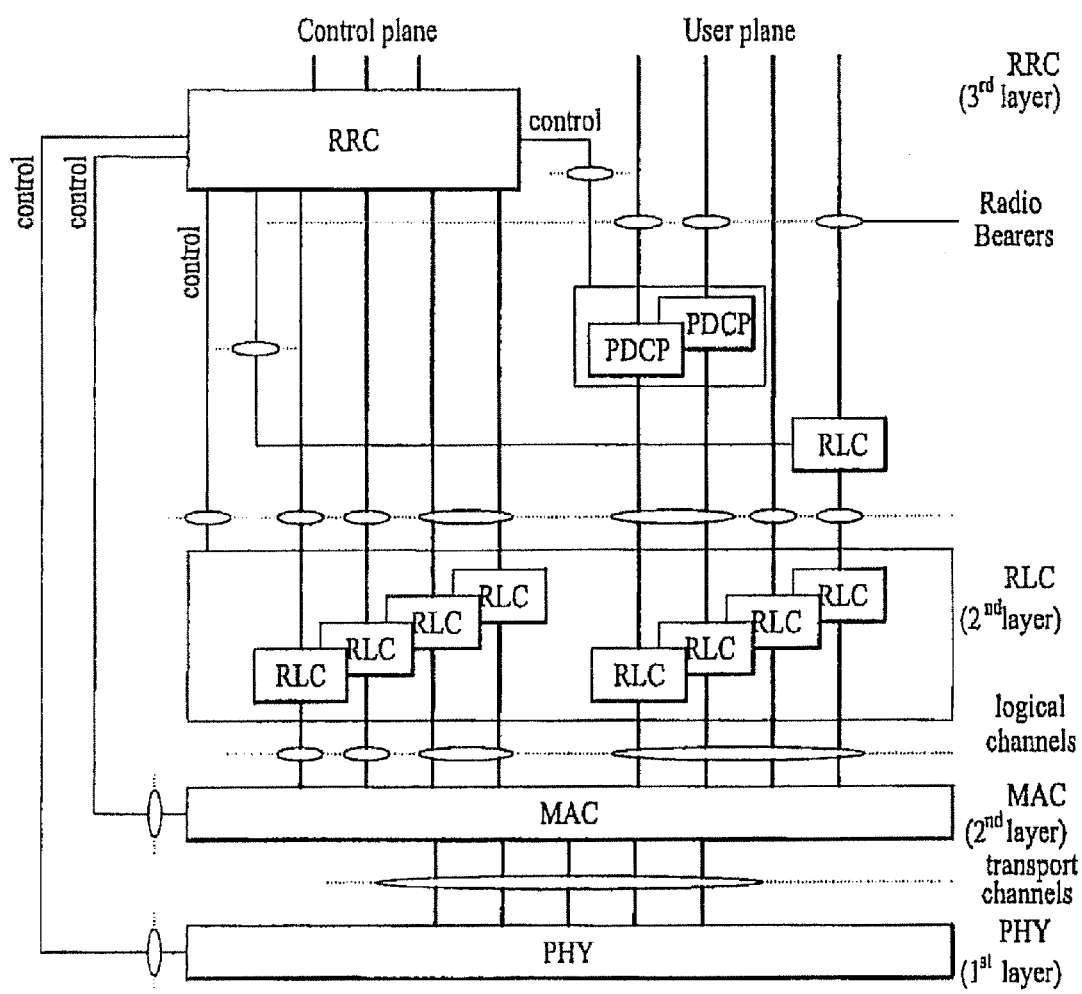
FIG. 2 is a diagram of architecture of a radio protocol used for UMTS.
Figure 3:
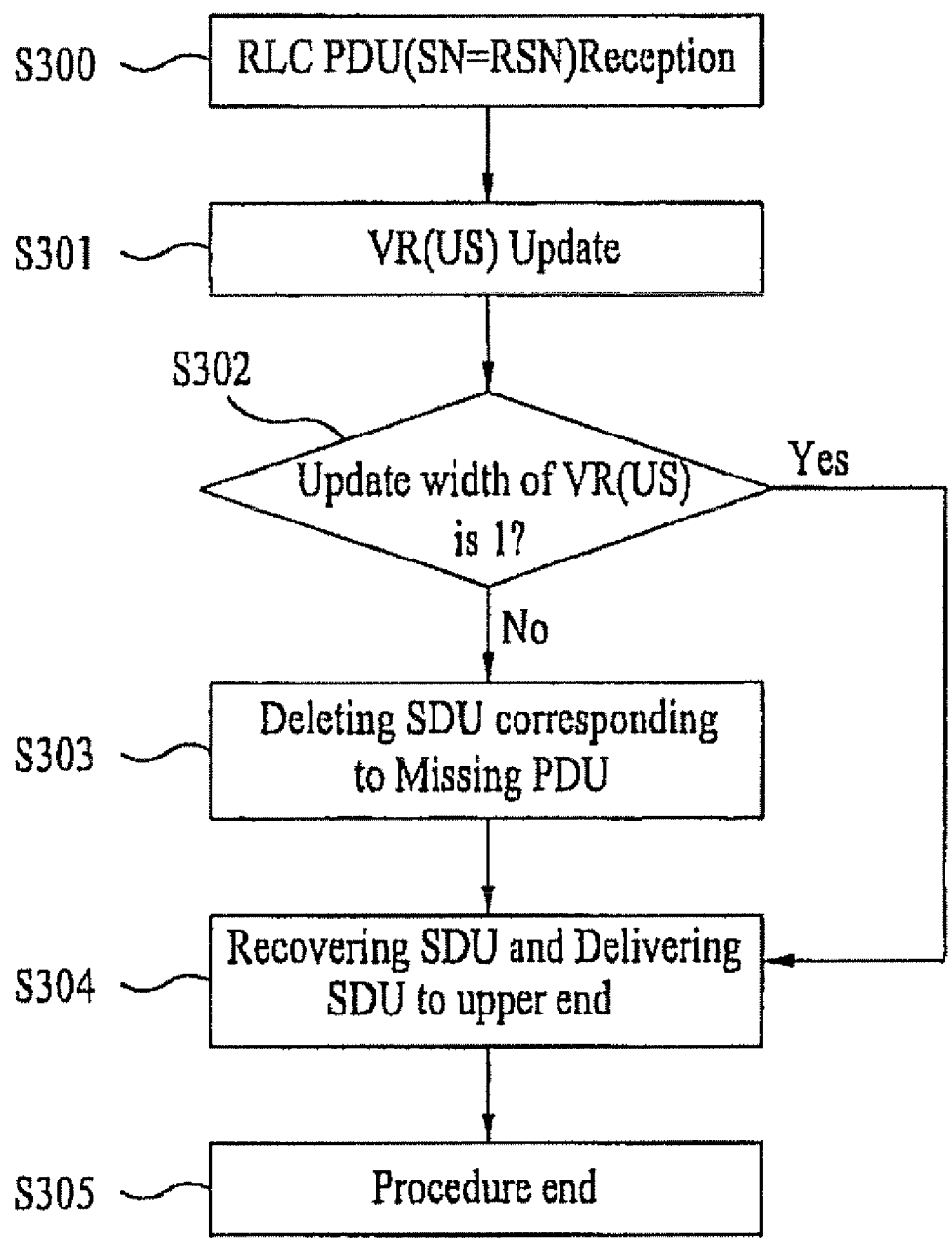
FIG. 3 is a flowchart of a process for receiving RLC PDU from a lower layer in a UM RLC operation of a receiving side according to a related art.
Figure 4:
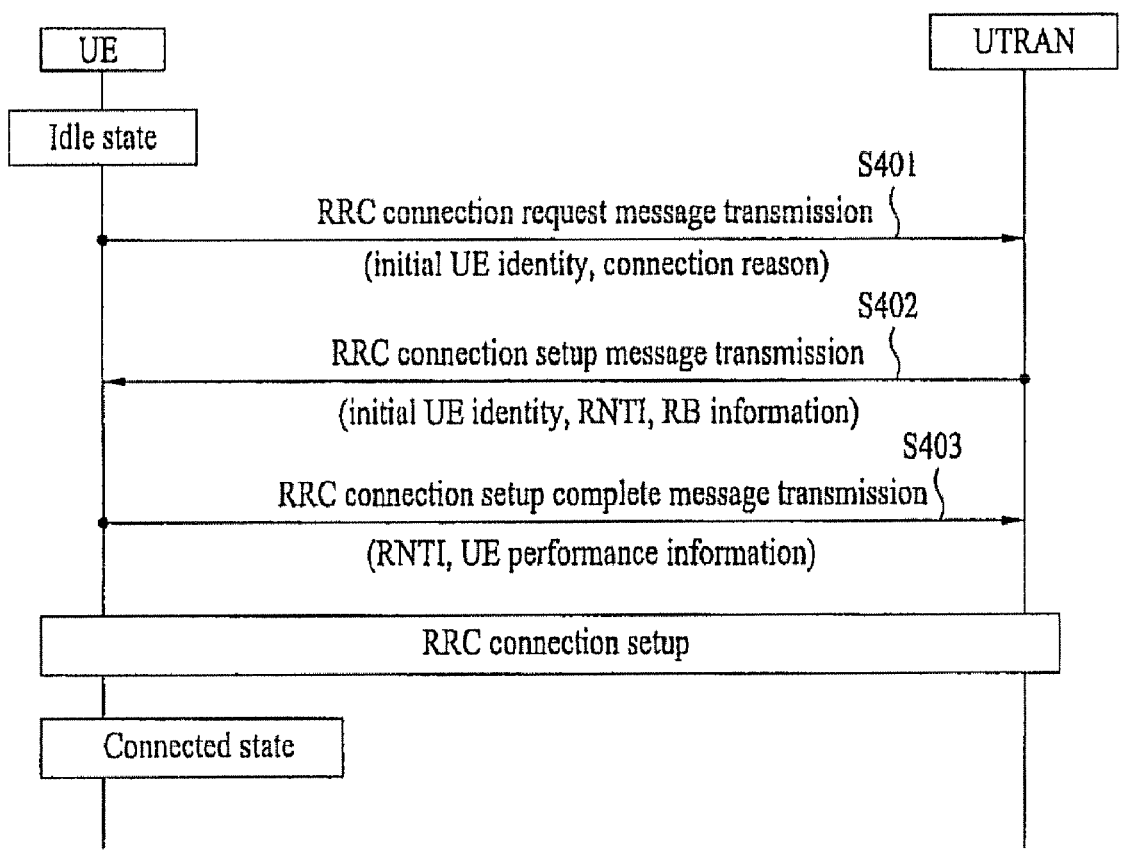
FIG. 4 shows a flowchart of an RRC connection procedure according to a related art.

Reference will now be made in detail to the preferred embodiments of the present invention, examples of which are illustrated in the accompanying drawings. Wherever possible, the same reference numbers will be used throughout the drawings to refer to the same or like parts.

First Embodiment

A signal transmitting/receiving method according to a first embodiment of the present invention is able to enhance the related art RRC connection setup procedure.

As mentioned in the foregoing description, an RRC connection setup message is transmitted via CCCH. In this case, the CCCH is used by a UM RLC. In doing so, messages are delivered via a common physical channel since a physical channel for a specific UE is not established. Namely, the RRC connection setup message is not delivered to a intended UE, via a dedicated physical channel. Hence, it is less probable that the corresponding UE will receive the message correctly.

Despite that a UE transmits an RRC connection request message, that a network successfully receives the RRC connection request message and that the network correctly transmits an RRC connection setup message to the UE, It may frequently happen that the UE fails to receive the RRC connection setup message due to a CCCH's characteristic as a common channel and a UM RLC's characteristic of not receiving ACK. In this case, after waiting for an expiration of a T300 timer, if failing to receive the RRC connection setup message until the expiration, the UE again transmits the RRC connection request message to the network. Since the T300 timer is actually set to 4 seconds in a UMTS system, a 4-second connection delay takes place each time the UE fails in receiving the RRC connection setup message. This connection delay provides a bad quality to a user.

A signal transmitting/receiving method according to an embodiment of the present invention proposes a method of transmitting a message to a UE from a network more reliably and quickly. In the embodiment of the present invention, in case that a network delivers an RRC message to a UE via a common physical channel or a common transfer channel, an RLC entity transmits RLC PDUs, which are generated for one RLC SDU, at least once.

In particular, the present invention proposes a method that, in case of receiving an RRC message via a common physical channel or a common transfer channel, a UE is able to correctly recover RLC SDUs to deliver to an upper layer in spite of receiving the same RLC PDUs plural times.

In particular, the present invention proposes an RLC entity that is operated using a re-ordering timer and a receiving window. Namely, in the present embodiment, the receiving window is used so that RLC PDUs can be sequentially stored according to SN in spite of being transmitted plural times. And, in the present embodiment, in case of using the receiving window, the re-ordering timer is used to prevent an operation from being delayed in the course of standing by for a reception of a specific RLC PDU.

In particular, in the above process, the present invention proposes that a network transmits the message via an RLC in an unacknowledged mode.

Preferably, in the above process, it is proposed that the network is an RNC. Preferably, in the above process, it is proposed that the RRC message is mapped to a common logical channel. Preferably, in the above process, it is proposed that the common logical channel is CCCH.

Preferably, in the above process, it is proposed that the RRC message is delivered via a common transfer channel. Preferably, in the above process, it is proposed that a common logical channel is mapped to the common transfer channel. Preferably, in the above process, it is proposed that the common transfer channel is FACH.

Preferably, in the above process, it is proposed that the common transfer channel is mapped to the common physical channel. Preferably, in the above process, it is proposed that the RRC message is delivered via the common physical channel. Preferably, in the above process, it is proposed that the common physical channel is S-CCPCH (secondary common control physical channel).

More specifically, the present invention proposes that a network should transmit an RRC message plural times to raise an RRC message reception success probability of a UE.

For this, the present invention proposes an RLC entity operating method for a case that a UE receives the same RLC PDU at least once via one common channel. Namely, in case that a UM RLC receives the same RLC PDU for the same RLC SDU plural times, the present embodiment proposes a method of processing the received RLC PDU using a receiving window and a re-ordering timer.

Preferably, the RLC PDU processing method using the receiving window means a processing method that the UM RLC manages a range of SN values of the RLC PDU that is expected to be received by the UM RLC itself based on the received RLC PDU.

Preferably, in case that the RLC PDU received by the UM RLC remains in the receiving window by not being reserved for reassembly, the RLC PDU processing method using the re-ordering timer means a method of processing the RLC PDU regardless of a reception of another PDU after duration according to the operated re-ordering timer.

Preferably, in case of receiving a re-ordering indication from an upper layer, the UM RLC operates by deciding that the same RLC PDU can be received via the channel at least once. In case of not receiving re-ordering indication from an upper layer, the UM RLC operates by deciding that the same RLC PDU can be received just once for one logical channel like the related art method.

Preferably, the UE will receive information for the re-ordering indication from a network. When UEs receive the RRC messages via system information, the network notifies information indicating whether the UEs execute the re-ordering. An RRC of the UE informs an RLC how the UE operates via the re-ordering indication based on the information.

In other words, in case of attempting to perform a more reliable RRC message transmission, the network notifies that a re-ordering function is used in sending the RRC message, via a channel and message for delivering the system information. If the network does not send the RRC message using the re-ordering function, the network notifies that the re-ordering function is not used via the system information or does not notify whether to use the re-ordering function.

If the system information instructs that the re-ordering function is used for the transmission of the RRC message, the UE uses the re-ordering function after having received the system information. In particular, the UE processes the RLC entity mapped to the channel carrying the RRC message using the re-ordering function. Yet, in case of receiving the system information instructing that the re-ordering function is not used (e.g., a case that a deactivation of the re-ordering function in the RRC message transmission is instructed or that the information indicating whether to activate the re-ordering function is not provided), the UE does not use the re-ordering function. In particular, the RLC entity mapped to the channel carrying the RRC message is processed not using the re-ordering function.

A presence or non-presence of the activation of the re-ordering function can be identified according to a release number instructed by the system information. In particular, if the system information instructs that a communication specification is the 3GPP release-7 or the 3GPP release-8, it is able to activate the re-ordering function.

In case of using the re-ordering function, it is preferable that the network provides various setup values for the re-ordering function. In this case, the setup values include a size of a receiving window, a timer value of a re-ordering timer and the like. In case of receiving the setup values via the system information, the UE performs a setup for the RLC entity using the received values.

The above-explained embodiment of the present invention is explained with reference to FIG. 5 as follows.

Figure 5:
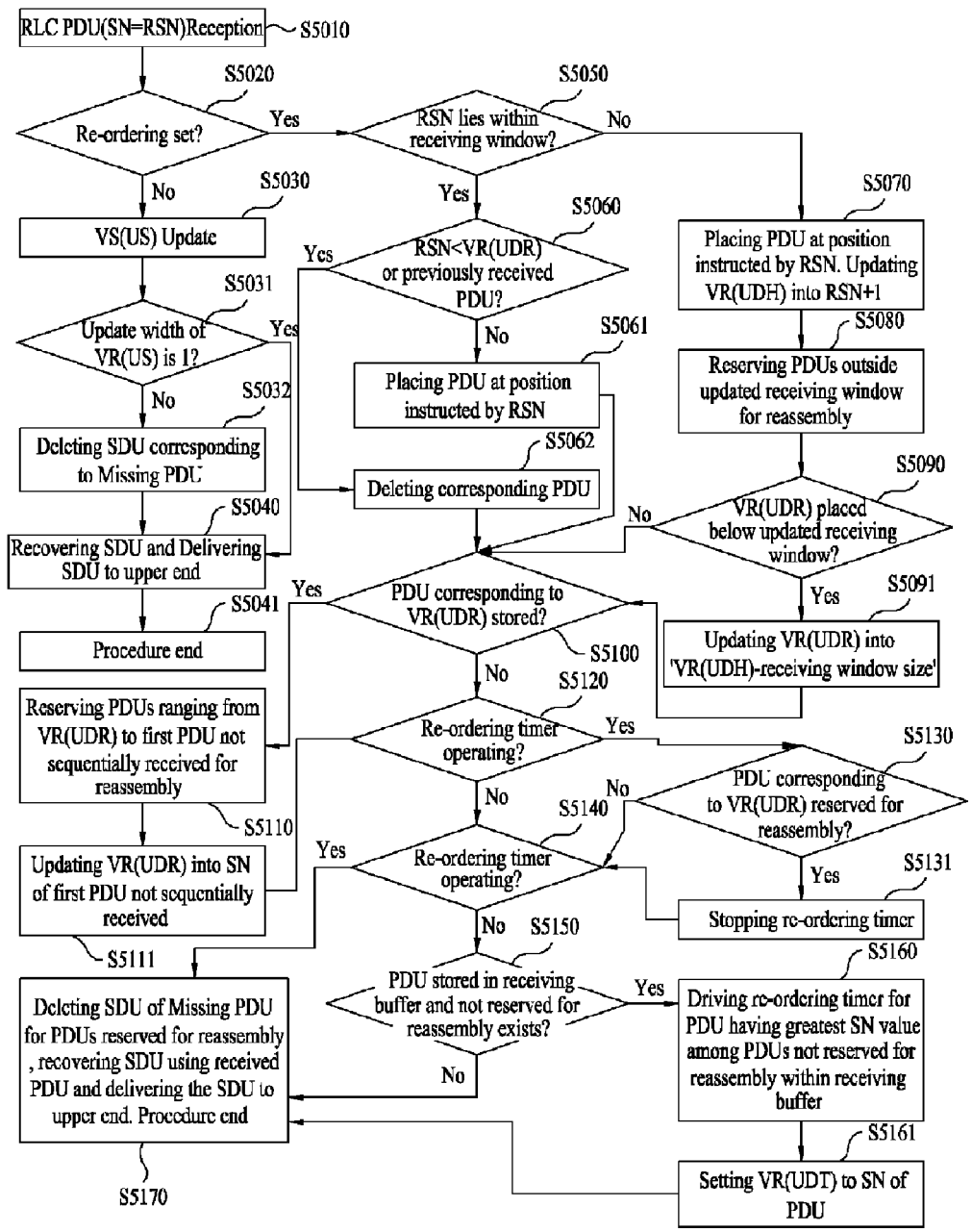
FIG. 5 is a flowchart of a re-ordering procedure according to an embodiment of the present invention.

FIG. 5 shows an example of a method of setting a receiving window and a re-ordering timer.

Variables for the receiving window and re-ordering timer proposed by the present invention are explained in the following description.

First of all, a receiving window corresponds to a range of an SN value of an RLC PDU received and processed by an RLC entity. The range of the receiving window is equal to or greater than a value resulting from subtracting a receiving window size from VR(UDH) that will be explained later.

The receiving window size is a value that indicates a size of the receiving window.

VR(UDR) indicates a reception standby number of the receiving window. This value is used in case that a re-ordering is set. And, this value means a value next to an SN value of a last RLC PDU that is sequentially received. An initial value of the VR(UDR) is determined in a following manner. First of all, if VR(UDH) is set according to an RLC PDU that is first received after initialization of the RLC entity, the initial value of the VR(UDR) is set to a value resulting from adding '1' to a value of subtracting a value of the receiving window size from a value of the VR(UDH).

VR(UDH) indicates a maximum reception number of a receiving window. This value is used in case that a re-ordering is set. This value means an upper limit value of a receiving window in a UM RLC. And, this value means a value next to a greatest value of an SN value of a received RLC PDU. If an RLC PDU having an SN (=x) deviating from a range of a previously set window is received, VR(UDH) is determined in a following manner. If an RLC PDU, which is 'x', is received, VR(UDH) is set to a value resulting from adding '1' to 'x'. An initial value of VR(UDH) is determined as an SN of an RLC PDU that is first received after initialization of an RLC entity.

VR(UDT) indicates a timer instruction number. This value is used only if a re-ordering is set. This value is set to an SN value corresponding to an RLC PDU of which re-ordering timer is set. And, an initial value is zero.

In a present embodiment, a UM RLC receives a new RLC PDU from a lower layer. According to whether a re-ordering is activated, if the re-ordering is not set up, the UM RLC operates as the related art UM RLC does. If the re-ordering is set up, the UM RLC operates according to an SN value of a received RLC PDU, a receiving window and a re-ordering timer (S1).

In the above procedure, the meaning that the UM RLC operates like the related art UM RLC indicates that VR(US) is updated according to an SN value of a received RLC PDU, that it is decided that there is a lost PDU if an update width of the VR(US) is not '1', that RLC PDUs associated with the RLC PDUs decided as lost are deleted, and that RLC PDUs decided as successfully received are recovered to be delivered to an upper layer. In the above procedure, if the update width of the VR(US) is '1', it is decided that there is no lost PDU. RLC PDUs are recovered based on the received RLC PDUs. The recovered RLC PDUs are then delivered to an upper layer.

An RLC SDU associated with a specific PDU indicates the RLC SDU if partial data of the RLC SDU or a length indication (LI) indicating an end of the RLC SDU is included in the specific RLC PDU.

The meaning of the above described 'UM RLC operates according to SN of RLC PDU, receiving window and re-ordering timer (S1)' is explained as follows.

First of all, a UM RLC checks a newly received RLC PDU using an SN value of the RLC PDU, a receiving window and a reception standby number (VR(UDR)) and the corresponding RLC PDU is then processed according to a result of the check (S2). The RLC PDU is additionally processed according to a presence or non-presence of RLC PDU of which SN value is VR(UDR) (S3). Thereafter, a re-ordering timer is additionally processed (S4). Finally, an RLC PDU, of which reassembly is reserved, is additionally processed (S5).

In the above procedure, the meaning of 'a UM RLC checks a newly received RLC PDU using an SN value of the RLC PDU, a receiving window and a reception standby number (VR(UDR)) and the corresponding RLC PDU is then processed according to a result of the check (S2)' is explained as follows.

First of all, a UM RLC checks whether an SN value of a received RLC PDU is located within a receiving window.

If the SN value of the received RLC PDU is located within the receiving window and if the SN value is smaller than VR(UDR) or if an RLC PDU corresponding to the SN value is received in advance, the corresponding RLC PDU is deleted.

Otherwise, the corresponding RLC PDU is placed at a position indicated by the SN value of the RLC PDU within the receiving window.

If the SN value of the received RLC PDU is not located within the receiving window, the received RLC PDU is placed at a position indicated by the SN value of the RLC PDU. And, by setting a value of VR(UDH) to the SN value of the RLC PDU, a position of the receiving window is updated.

Subsequently, RLC PDUs of which SNs deviate from a range of the updated receiving window (i.e., RLC PDUs of which SNs do not exist between a lower limit value resulting from subtracting a value of a receiving window size from VR(UDH) and an upper limit value of VR(UDH)) among PDUs stored in a receiving buffer provided to a UE are reserved for reassembly. If VR(UDR) is smaller than the updated receiving window, VR(UDR) is updated into a value resulting from subtracting the receiving window size from VR(UDH).

In the above procedure, the meaning of 'The RLC PDU is additionally processed according to a presence or non-presence of RLC PDU of which SN value is VR(UDR) (S3)' is explained as follows.

First of all, if an RLC PDU having a specific SN value exists within a receiving window, RLC PDUs ranging from the RLC PDU to a first RLC PDU that is not sequentially received are reserved for reassembly. And, a value of VR(UDR) is updated into an SN value of the first RLC PDU that is not sequentially received.

In the above procedure, the meaning of 'a re-ordering timer is additionally processed (S4)' is explained as follows.

First of all, if a re-ordering timer, which is operating, exists, a UM RLC checks whether an RLC PDU having an SN value of VR(UDT) is reserved for reassembly. If the corresponding RLC PDU is reserved for reassembly according to a result of the check, the re-ordering timer is stopped.

Subsequently, the UM RLC again checks whether a re-ordering timer, which is operating, exists. If there is no re-ordering timer that is operating as a result of the check, the UM RLC checks whether there are RLC PDUs which exist within a receiving buffer and of which reassembly is not reserved. If there are RLC PDUs which exist within a receiving buffer and of which reassembly is not reserved, a re-ordering timer is re-driven for a RLC PDU corresponding to a highest SN value among the PDUs and VR(UDT) is updated into the SN value of the RLC PDU.

In the above procedure, the meaning of 'an RLC PDU, of which reassembly is reserved, is additionally processed (S5)' is explained as follows.

First of all, for an RLC PDU of which reassembly is reserved, if there are RLC PDUs failing to be received, RLC SDUs associated with the RLC PDUs failing to be received are deleted. RLC SDUs are recovered (i.e., reassembled) based on RLC PDUs having been received. The recovered RLC PDUs are then delivered to an upper layer. In this case, an RLC SDU associated with a specific RLC PDU means an RLC PDU corresponding to a case that partial data of the RLC SDU or an LI (length indication) indicating an end of the RLC PDU is included in the specific RLC PDU.

In the above procedures, if the re-ordering timer expires at any time, a reservation is made to reassemble RLC PDUs equal to or smaller than the VR(UDT) value. A reservation is made to reassemble RLC PDUs ranging from the RLC PDU of VR(UDT) to the first RLC PDU not sequentially received. And, the VR(UDR) is updated to the SN value of the first RLC PDU that is not sequentially received.

As a result of completion of the above procedures, if there are RLC PDUs which exist within the receiving buffer and of which reassembly is not reserved, the re-ordering timer is re-driven for the RLC PDU corresponding to the highest SN value among the PDUs. And, the VR(UDT) is updated into the SN value of the RLC PDU. If the PDU of the SN corresponding to the VR(UDT) is removed from the receiving buffer, the re-ordering timer is stopped. When RLC PDUs are stacked in the receiving buffer, if the re-ordering timer is not activated, the re-ordering timer starts to operate and the VR(UDT) is designated as the SN value of the PDU.

FIG. 5 shows a detailed example of implementing the above-explained operations through the variables. Individual steps shown in FIG. 5 are explained in detail as follows.

First of all, an RLC PDU of which SN value is 'RSN' is received from a lower layer of a UM RLC (S5010).

If a re-ordering is set up (S5020), the operation is executed from a step S5050. If the re-ordering is not set up (S5020), the operation is executed from a step S5030.

Subsequently, VR(US) is updated (S5030). If an update width of VR(US) is not '1' (S5031), SDUs associated with PDUs decided as lost are deleted (S5032). In this case, RLC PDUs decided as lost means the RLC PDUs each of which has a sequence number equal to or greater than the VR(US) prior to the update or smaller than 'RSN'.

RLC SDU is recovered using a received RLC PDU. The recovered RLC PDU is delivered to an upper layer (S5040). A procedure is then ended (S5041).

If 'RSN' is not included in an area of a receiving window (S5050), the operation is executed from a step S5070. If 'RSN' is included in the area of the receiving window (S5050), the operation is executed from a step S5060.

If 'RSN' is smaller than VR(UDR) or if a received RLC PDU is the PDU that was previously received (S5060), the corresponding RLC PDU is deleted (S5062). Otherwise, the corresponding RLC PDU is placed at a position instructed by 'RSN' within a receiving buffer (S5061). The operation is then executed from a step S5100.

A received RLC PDU is placed at a position instructed by 'RSN' and VR(UDH) is then updated into a value resulting from adding '1' to 'RSN' (S5070).

RLC PDUs, each of which has an SN value smaller than an updated receiving window (i.e., each of which is located outside the receiving window), are reserved for reassembly (S5080).

If VR(UDR) is located below the updated receiving window (S5090), VR(UDR) is updated into a value resulting from subtracting a receiving window size from VR(UDH) (S5091).

If an RLC PDU corresponding to VR(UDR) is not stored in the receiving buffer (S5100), the operation is executed from a step S5120. Otherwise, the operation is executed from a following step S5110.

RLC PDUs ranging from an RLC PDU corresponding to VR(UDR) to a first RLC PDU that is not sequentially received within the receiving buffer are reserved for reassembly (S5110). Subsequently, VR(UDR) is updated into an SN value of the first RLC PDU that is not sequentially received (S5111).

If a re-ordering timer is not activated (S5120), the operation is executed from a step S5140. Otherwise, the operation is executed from a step S5130.

If an RLC PDU corresponding to VR(UDT) is reserved for reassembly (S5130), the re-ordering timer is stopped (S5131).

If the re-ordering timer is operating (S5140), the operation is executed from a step S5170. Otherwise, the operation is executed from a step S5150.

If there is an RLC PDU stored in receiving buffer and not reserved for reassembly (S5150), the operation is executed from a step S5160. Otherwise, the operation is executed from a step S5170.

The re-ordering timer is driven for an RLC PDU having a greatest SN value among RLC PDUs not reserved for the reassembly within the receiving buffer and VR(UDT) is set to the SN value of the PDU (S5160, S5161).

For RLC PDUs of which re-ordering is reserved, RLC SDUs associated with RLC PDUs decided as lost are deleted. For RLC PDUs having been received, RLC SDUs are recovered. The recovered RLC PDUs are delivered to an upper layer. The operation is then ended (S5170).

The above-explained whole operation is summed up as follows.

First of all, as mentioned in the foregoing description, a receiving window is used as a means for processing a repeatedly received UM RLC PDU. In particular, a repeatedly received UM RLC PDU is processed using VR(UDR) indicating a position of a sequentially received RLC PDU, VR(UDH) indicating an upper limit of the receiving window and a size of the receiving window.

In case of using the receiving window, if there is a first received RLC PDU, the first received RLC PDU is stored and an area of the receiving window is updated. If there is an RLC PDU that is received repeatedly or sequentially in advance, the corresponding RLC PDU is deleted. In this case, upper and lower limits of the receiving window are updated to manage RLC PDUs that are not sequentially received.

In case of using the receiving window, if specific RLC PDUs are received plural times or sequences of the specific RLC PDUs are not sequential, it is advantageous that the PDUs can be sequentially stored. Yet, in this case, it may happen that an RLC PDU of which reception is impossible is waited for endlessly. So, RLC PDUs failing to be received within a time limit according to a re-ordering timer and their associated RLC SDUs are deleted. In particular, according to an operation of the re-ordering timer, RLC PDUs having SNs equal to or smaller than VT(UDT) are regarded as reception-impossible RLC PDUs and are then deleted.

In the above process, an operation of a network should consider a UE failing to support a re-ordering function as well as a UE supporting the re-ordering function. In this case, the UE failing to support the re-ordering function means a UE performing an operation of the related art UM RLC. This UE always wishes that an SN of a received RLC PDU should be incremented by '1' each time. And, this UE assumes that a loss of an RLC PDU takes place if an increment of the SN exceed '1'. Hence, in case that the network supports the re-ordering function, if a transmission sequence of RLC PDUs for one RLC SDU is randomly changed, the UE failing to support the re-ordering function is unable to per form a reception correctly.

Therefore, the present invention intends to propose a method of transmitting RRC messages correctly to a UE for which an RLC entity of a network supporting a re-ordering function does not support the re-ordering function.

In particular, the present invention proposes that RLC PDUs for one RLC SDU should be sequentially transmitted. For instance, if PDUs configuring RLC SDU 1 include RLC PDU 1, RLC PDU 2 and RLC PDU 3, the RLC PDUs are always transmitted to a UE in sequence of RLC PDU 1→RLC PDU 2→RLC PDU 3. Even if one RLC PDU is transmitted at least twice, the present invention proposes that the RLC PDUs should be transmitted in sequence of RLC PDU 1→RLC PDU 2→RLC PDU 3→RLC PDU 1→RLC PDU 2→RLC PDU 3.

In transmitting a message from a network to a UE, if RLC PDU is transmitted plural times, the present invention proposes that one RLC PDU should be consecutively transmitted as many as a count of retransmissions. For instance, if RLC PDUs include RLC PDU 1, RLC PDU 2 and RLC PDU 3 and if one RLC PDU is transmitted twice each, the present invention proposes that the RLC PDUs should be transmitted in a manner of RLC PDU 1→RLC PDU 1→RLC PDU 2→RLC PDU 2→RLC PDU 3→RLC PDU 3.

In transmitting consecutive RRC messages, if one targets a UE supporting a re-ordering and if the other targets a UE not supporting a re-ordering, the present invention proposes that parts of two messages should not be included in one RLC PDU. In particular, the present invention proposes that parts of at least two RLC SDUs should not be included in one RLC PDU.

And, the present invention proposes that a re-ordering function should be selectively used. In particular, the present invention proposes that a network should use a function of transmitting one RLC PDU several times to a UE supporting a re-ordering function only based on release information of UE or information indicating a presence or non-presence of a re-ordering function supported by the UE. For this, the present invention proposes that a UE should inform a network of a presence or non-presence of its re-ordering function support in RRC connection.

Second Embodiment

A second embodiment according to the present invention proposes a method of preventing a UE from awaiting a response made by a network unnecessarily long.

In particular, if an RRC message sent by a UE is not received by a network, it is meaningless for the UE to await a response from the network.

For instance, a UE awaits a response from a network after having sent an RRC connection request message. If there is no response until a retransmission timer expires, the UE sends the RRC connection request message again. In this case, if the RRC connection request message sent by the UE is not correctly forwarded to the network, it is meaningless for the UE to await the response made by the network. Hence, the UE preferably retransmits an RRC message such as an RRC connection request message and the like right after having recognized that a message transmitted by the UE itself had not been correctly forwarded to the network.

For this, in case of sending an RRC message on an uplink shared channel, if there is no response from a network within a predetermined time to indicate that the message has been correctly received, a UE retransmits the RRC message.

Preferably, in the above process, the present invention proposes that the network should include an RNC. Preferably, in the above process, the present invention proposes that the RRC message should be mapped to a common logical channel. More preferably, in the above process, the present invention proposes that the common logical channel should include CCCH (common control channel).

Preferably, in the above process, the present invention proposes that the RRC message should be transferred via a common transfer channel. More preferably, in the above process, the present invention proposes that the common logical channel should be mapped to the common transfer channel. More preferably, in the above process, the present invention proposes that the common transfer channel should include RACH (random access channel).

Preferably, in the above process, the present invention proposes that the common transfer channel should be mapped to a common physical channel. More preferably, in the above process, the present invention proposes that the RRC message should be transferred via the common physical channel. More preferably, in the above process, the present invention proposes that the common physical channel should include PRACH (physical random access channel).

In the above process, in case of receiving the RRC message from the UE, the network immediately makes a response to the received message. And, the response can be made in various ways.

In a first example of making a response immediately, in case of receiving a message from a UE via the channels, a network immediately transmits acknowledgement to the UE. For instance, in case of receiving an RRC connection request message, a network informs the UE that it has received the RRC connection request message. The UE, which has received this information, then stands by until receiving a response message for the RRC message from the network. For instance, the UE having transmitted an RRC connection request message receives an acknowledgement for the transmitted message and then awaits an RRC connection setup message.

In the above process, in case of not receiving the acknowledgement from the network within a predetermined time after having transmitted the RRC message via the channel, the UE immediately retransmits the RRC message.

It should be noted that the acknowledgement information means the information indicating whether the network has received the RRC message sent by the UE successfully. For instance, the related art RRC connection setup message, which is the message for the RRC connection instead of indicating a presence or non-presence of a successful reception of a response message for an RRC connection request message, id discriminated from the acknowledgement information.

Preferably, in the above process, the acknowledgement message sent by the network to the UE is an RRC message.

Preferably, in the above process, the present invention proposes that the network should use a special physical channel to send the acknowledgement for the RRC message transmitted by the UE.

In a current transmission on RACH, a preamble part is acknowledged via a channel called AICH (acquisition indication channel). So, a response for a message part transmitted by a UE can be transmitted to the UE only via a channel physically specified to a specific UE. In particular, an acknowledgement can be made via a physical channel for a specific UE only.

For instance, in case of receiving an RRC connection request message, a network informs a UE that it has received the RRC connection request message using a physical channel. The UE having received this information stands by until receiving a response message for the RRC message, which was sent by the UE itself, from the network. For instance, in case of transmitting an RRC connection request message, a UE awaits an RRC connection setup message after having received a corresponding acknowledgement.

In the above process, in case of not receiving the acknowledgement via the physical channel from the network within a predetermined time after having transmitted the RRC message via the channel, the UE immediately retransmits the RRC message.

In the above process, the physical channel, via which the UE performs the acknowledgement, is transmitted to the UE via a downlink physical channel with a duration after the UE has transmitted the RRC message or after the UE has performed a data transmission via an uplink physical channel. And, the physical channel is able to transmit 1-bit information to the UE.

In a second example of making a response immediately, a network having received an RRC message from a UE informs the UE of an estimated time at which the network will send a response. Substantially, in case of being overloaded, the network will preferentially handle a job having a high priority. Although an RRC connection request message having sent by a specific UE is correctly received by a network, if jobs having high priorities are left undone, a maximum time T300 for the UE to await a response message may be exceeded. So, if the UE retransmits the RRC connection request message, it would result in a job overload of the network. Hence, it would be helpful if the network informs the UE of an estimated time for sending a response to the UE. The UE receives the message and then stands by for the corresponding time. Even if a timer t300 expires in the course of the standby, the UE awaits an RRC response message for the time informed by the network. In case of failing to receive the RRC response message from the network, the UE newly transmits a message or performs another process.

Third Embodiment

A third embodiment according to the present invention proposes a method of operating a new RLC entity and a format of a new RLC message.

A method of operating a new RLC entity according to a third embodiment of the present invention is explained as follows.

First of all, an RLC entity substantially performs an operation of delivering an RLC SDU received from an upper layer or an operation of recovering RLC SDU by combining RLC PDUs delivered from a lower layer and delivering the RLC SDU to an upper layer. So, the RLC entity operates regardless of contents of data transmitted by the RLC entity itself. A defined format of RLC PDU does not indicate what is a target of the RLC SDU.

Specifically, in case that an RLC entity is mapped to a channel shared by a plurality of UEs, The RLC entity delivers all kinds of messages received and decoded successfully by the RLC entity itself to an upper layer. And, the RLC entity discards RLC PDU received in part by the RLC entity itself. Yet, most of RRC messages including an RRC message transmitted via a common channel for example indicate which UE is targeted through a specific part (e.g., first part) of the corresponding message. Namely, if a specific RLC SDU is segmented into several parts, a receiving side is able to know who is targeted by a corresponding RRC message in case of receiving a first part correctly.

In particular, an RLC entity is able to know whether a segment of RLC SDU included in a received RLC PDU is a first part or not using several LIs. And, a physical layer is able to verify whether each RLC PDU is erroneous. So, for RLC PDU received via a common channel, although an RLC entity is unable to receive all RLC PDUs associated with the RLC PDU, if the RLC PDU includes a first part of a specific RLC SDU and if the RLC PDUs are free from CRC error, the RLC entity extracts parts of the RLC SDU consecutively extractable from the RLC PDU and consecutive RLC PDUs from the RLC PDU, delivers the extracted parts to an RRC end and informs the RRC end that it is an incomplete RLC SDU.

An RRC entity having received this checks whether its identity is included by interpreting a first part using a portion of the RRC message. If its identity is included, the RRC entity recognizes that the RRC message transmitted to the RRC entity fails in transmission and then decides that it is unable to correctly receive a response awaited by the RRC entity itself. The RRC entity then immediately re-performs an RRC process attempted by the RRC entity itself. For instance, if a UE is awaiting an RRC connection setup message and if an RLC entity delivers an RRC message including a first part together with an indication of an incomplete reception, an RRC entity checks whether its identity is included in the RRC message delivered in part from the RLC. If its identity is included as a result of the check, the RRC entity decides that it fails in an RRC connection setup message reception and then immediately initiates an RRC connection request message transmission again.

Of course, if the RRC connection request message is transmitted by exceeding a maximum allowable count of RRC connection request message transmissions, the RRC stops all operations and preferably informs an upper layer of it.

In the above process, the identity of the RRC entity means such an identity as an RNTI, an IMSI (international mobile station identity) used by an upper layer, a P-TMSI (packet temporary mobile subscriber identity), a TMSI (temporary mobile subscriber identity) and the like.

In summary, through the above-explained operations, unlike the related art, an RLC entity according to the third embodiment of the present invention does not delete a corresponding SDU and PDUs corresponding to the corresponding SDU even if a successful recovery of SDU is impossible. In particular, in case that a first part of SDU is correctly received, it is able to recognize a recipient of a message. So, a portion of RLC PDU, which is recoverable in case that there is no error for RLC PDUs including a first part of a specific RLC PDU, is transmitted to an upper layer.

A format of a new RLC message proposed by a third embodiment of the present invention is explained as follows.

First of all, a MAC layer is able to send a response to a UE using a higher identity of UE. Alternatively, an identity of UE can be added by extending a header part of RLC PDU. In particular, when a network sends an RRC message via the above channel, an RLC entity to which the RRC message is mapped transmits the RRC message by including an identity in an RLC PDU. In case of receiving any one RLC PDU corresponding to the RRC message, a UE is able to know that a network has made a response to the RRC message having been sent by the UE side. In this case, in case of failing to completely recover RLC SDU connected to the RLC PDU, the UE is able to send the RRC message to the network by performing an RRC process again. Through this, fast transmission and reception of RRC message are enabled.

Preferably, the RRC process is a process for transmitting an RRC connection setup message. Preferably, in the process, the message sent by the network to the UE includes a cell update confirm message. In particular, in case that communications between cell-A and cell-B are performed according to a movement of the UE, a cell update procedure for the cell-B is executed. In the cell update procedure, a cell update confirm message is transmitted by network. In this case, information for identifying a UE can be included in the cell update confirm message.

Accordingly, the present invention provides the following effects or advantages.

First of all, a mobile terminal is able to perform an RRC connection process without an unnecessary standby.

Secondly, a cell update procedure can be performed faster by a control information processing method according to the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of processing a radio link control (RLC) protocol data unit (PDU) at a RLC layer operating in an unacknowledged mode (UM) in a mobile communication system, the method comprising:
receiving at least one RLC PDU from a lower layer, the at least one RLC PDU corresponding to an RLC service data unit (RLC SDU);

determining whether the at least one RLC PDU includes a start point of the RLC SDU when the RLC SDU fails to be reassembled from the at least one RLC PDU;

reassembling the at least one RLC PDU to generate a partial RLC SDU if the at least one RLC PDU includes the start point of the RLC SDU; and discarding all of the at least one RLC PDU if none of the at least one RLC PDU includes the start point of the RLC SDU.

2. The method of claim 1, wherein the partial RLC SDU includes regions which are consecutively received without error from the start point of the RLC SDU.

3. The method of claim 1, wherein the at least one RLC PDU corresponds to a radio resource control (RRC) connection setup message.

4. The method of claim 1, further comprising:

transmitting, at the RLC layer, the partial RLC SDU to an upper layer;

checking, at the upper layer, whether an identity of the upper layer is included in the partial RLC SDU;

transmitting, at the upper layer, a request message for controlling radio resources to a network according to a result of the checking; and re-receiving, at the RLC layer, the at least one RLC PDU corresponding to a response message to the request message.

5. The method of claim 4, wherein the identity is included in a header of the at least one RLC PDU.

6. The method of claim 4, wherein the response message is a radio resource control (RRC) connection setup message.

7. The method of claim 4, wherein the response message is a cell update confirm message.

* * * * *